(12) United States Patent
Broadbent et al.

(10) Patent No.: US 9,400,055 B2
(45) Date of Patent: Jul. 26, 2016

(54) BLADDER ACCUMULATOR VOLUME INDICATING DEVICE

(71) Applicants: Thomas Broadbent, Glossop (GB); Heath Stephenson, Nailsworth (GB)

(72) Inventors: Thomas Broadbent, Glossop (GB); Heath Stephenson, Nailsworth (GB)

(73) Assignee: AES Engineering Ltd., Rotherham (GB)

( * ) Notice: Subject to any disclaimer, the term of this patent is extended or adjusted under 35 U.S.C. 154(b) by 303 days.

(21) Appl. No.: 14/013,258

(22) Filed: Aug. 29, 2013

(65) Prior Publication Data

US 2015/0059889 A1    Mar. 5, 2015

(51) Int. Cl.
*F16J 15/40* (2006.01)
*F15B 1/02* (2006.01)
*F16J 15/34* (2006.01)

(52) U.S. Cl.
CPC . *F16J 15/40* (2013.01); *F15B 1/02* (2013.01); *F16J 15/3492* (2013.01); *F15B 2201/51* (2013.01); *Y10T 137/8225* (2015.04)

(58) Field of Classification Search
CPC ................... F15B 15/28; F16J 15/40
USPC ............... 138/26, 30; 137/553, 557
See application file for complete search history.

(56) References Cited

U.S. PATENT DOCUMENTS

| | | | | |
|---|---|---|---|---|
| 3,456,673 A * | 7/1969 | Legrand | ........... | F15B 1/103 137/202 |
| 4,430,049 A * | 2/1984 | Aiba | ........... | F04B 11/0075 138/31 |
| 6,871,672 B2 * | 3/2005 | Kurokawa | ........... | B60T 13/148 138/26 |
| 2011/0197658 A1 * | 8/2011 | Da Costa | ........... | B64C 25/46 73/37.5 |
| 2011/0219761 A1 * | 9/2011 | Johnson | ........... | F15B 1/165 60/414 |

* cited by examiner

*Primary Examiner* — Paul R Durand
*Assistant Examiner* — Vishal Pancholi
(74) *Attorney, Agent, or Firm* — Edwin D. Schnindler

(57) ABSTRACT

A mechanical seal support system includes a bladder accumulator with a first connection to the top of the bladder accumulator and a second connection to the bottom of the bladder accumulator with a device that is responsive to the pressures at each of the first and second connections of the bladder accumulator for providing an output determined by the difference between the pressures. The mechanical seal support system further includes a display for displaying the output in a manner indicative of the volume of the fluid in the bladder accumulator relative to a predetermined volume.

12 Claims, 4 Drawing Sheets

BLADDER ACCUMULATOR VOLUME INDICATING DEVICE

BACKGROUND OF THE INVENTION

1. Technical Field of the Invention

The present invention relates to a method of determining the volumetric level of barrier fluid in a mechanical seal pressure vessel.

2. Description of the Prior Art

In an American Petroleum Institute ("API") Plan 53B mechanical seal support system, a bladder is pre-charged with nitrogen to a predetermined pressure. Once it has been pre-charged with gas, it is filled with barrier fluid to the required pressure: 2 barg greater than maximum product pressure. During operation, the accumulator is isolated from the gas and the barrier fluid source.

In normal operation, it is anticipated that there will be leakage from the mechanical seal, which will reduce the barrier fluid volume in the accumulator over time. As the fluid level in the accumulator drops, pressure will be lost. This can result in the contamination of the barrier fluid by the product and may lead to premature failure of the seal. In the worst case scenario, the product could escape and a fire could result from the over-heating of the seal. If the leakage rate of the seal is known, it is possible to estimate when the barrier fluid will require refilling. It is a common industry standard that it can be expected for the barrier fluid to require refilling every 28 days or more, although this may vary depending on the volume of barrier fluid, the seal leakage rate and the alarm strategy employed. Also, due to unforeseen variations in seal performance or environmental conditions, it is sometimes not possible to predict with accuracy when refilling will be required and so controls need to be implemented.

The existing controls come either in the form of pressure transmitters connected to the accumulator, which highlight when the pressure of the barrier fluid has reduced to a particular level and the accumulator needs refilling, or a combination of pressure and temperature transmitters connected to the site distribution control system ("DCS.") The combination of a pressure and temperature transmitter is sometimes preferable due to changes in ambient temperature affecting the accuracy of the pressure readings. An algorithm in the site DCS system utilizes the readings from both the transmitters to calculate the volume of barrier fluid left in the accumulator. If a DCS is not available, it has been proposed that individual single loop controllers are used on each 53B system. Any control involving an electrical component will require ATEX approval with the result that these two solutions can be very expensive and difficult for the site to implement. It is therefore the purpose of this invention to provide an alternative means for fluid level detection.

SUMMARY OF THE INVENTION

According to the present invention there is provided a mechanical seal support system comprising:
a bladder accumulator;
a connection to the top of the accumulator and a connection to the bottom of the accumulator;
means responsive to the pressures at each of said connections and for providing an output determined by the difference between said pressures; and,
means for displaying said output in a manner indicative of the volume of the fluid in the accumulator relative to a pre-determined volume.

Preferably, the display means is disposed outside the internal volume of the bladder accumulator.

Preferably, the display means is mounted directly adjacent the current stand of the API Plan 53B.

Preferably, at least one manifold connects ports of the accumulator to the pressure responsive means allowing for interference with said pressure responsive means without depressurizing the system.

Preferably, there are two manifolds of which one allows for pre-charging of the accumulator to be done at the maximum reach of a person in the fifth percentile.

Preferably, the system includes means for determining the absolute pressure between the two connections.

Preferably, the display means includes means for displaying the compared pressure reading and the absolute pressure reading.

Preferably, the system includes means for transmitting the output to a receiver.

Preferably, the system includes means, responsive to said output, for providing additional fluid to said vessel.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

Figure 1:
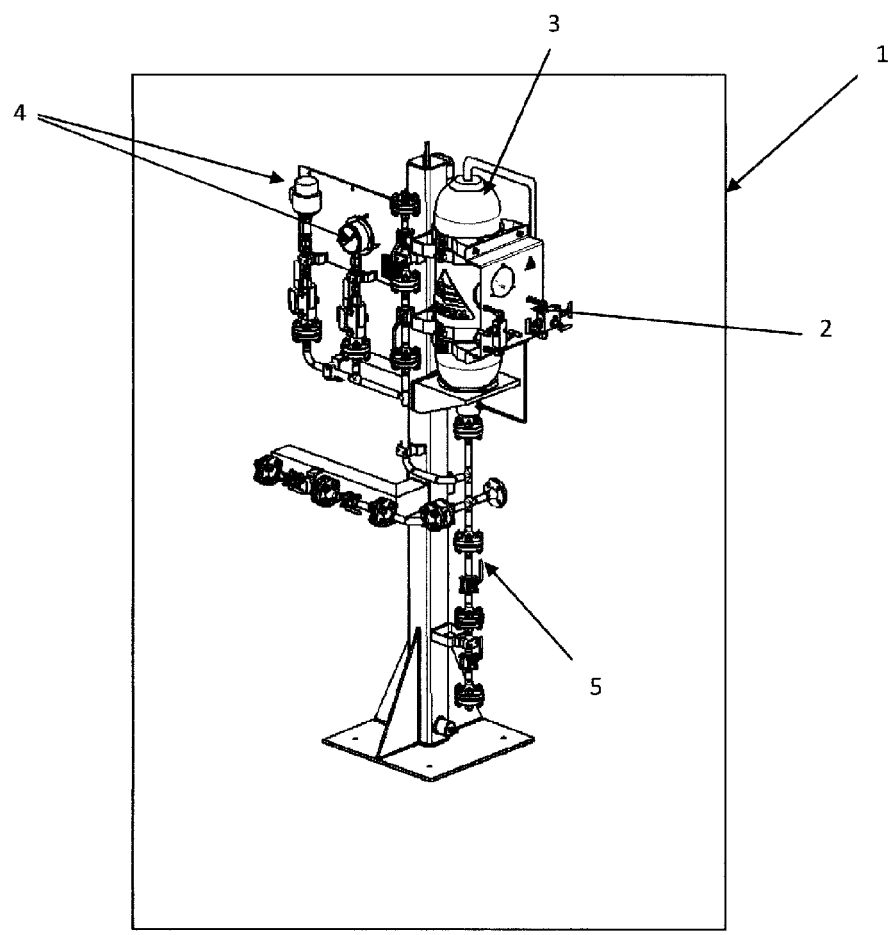
FIG. 1 illustrates the API Plan 53B seal support system incorporating a first embodiment of the present invention.

Referring to FIG. 1 of the accompanying drawings, there is illustrated an API Plan 53B seal support system 1 incorporating the present invention 2. The seal support system comprises a bladder accumulator 3, which connects to a pressure gauge and transmitter 4, and communicating with the mechanical seal loop using an arrangement of pipe work 5.

Figure 2:
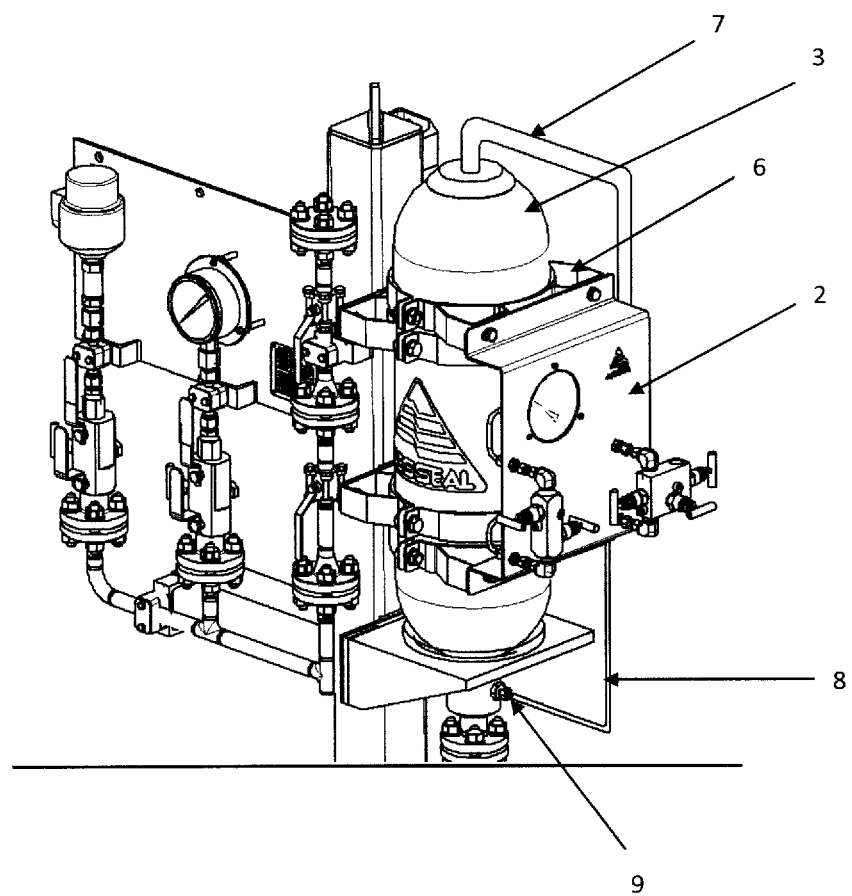
FIG. 2 illustrates a more detailed view of the seal support system of FIG. 1.

Referring to FIG. 2 of the accompanying drawings, there is illustrated the present invention 2 connecting to the bladder accumulator 3 using only the existing brackets 6 of said bladder accumulator. A pipe 7, vertically extending from the top of the bladder accumulator, provides the present invention with the nitrogen connection from the bladder, while a second pipe 8 provides the present invention with the fluid connection from the bladder accumulator. These two pipes attach to the accumulator and the present invention using a series of standard connections 9.

Figure 3:
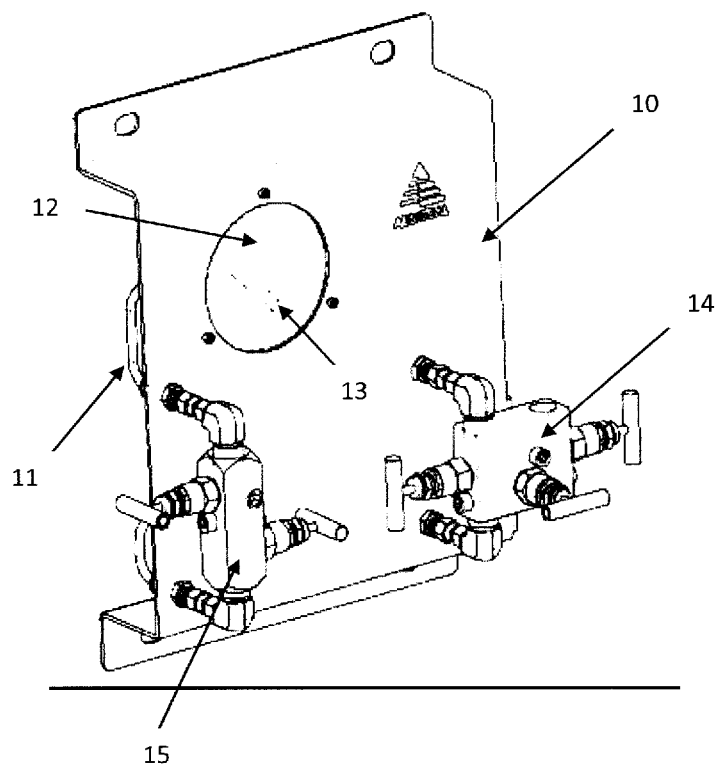
FIG. 3 illustrates in greater detail part of the seal support system of FIG. 1; and, FIG. 4 illustrates part of a seal support system incorporating a second embodiment of the present invention.

Referring to FIG. 3 of the accompanying drawings, a panel 1 is mounted so that there is adequate spacing between the accumulator and said panel to accommodate pipe work 11. A visual indication signalling feature 12 is mounted on the panel 10 and encases or includes indicating wand 13. A manifold 14 allows nitrogen isolation and ventilation of the system. The positioning of manifold 14 lowers the pre-charge height so that pre-charging may be performed at an ergonomic level. A second manifold 15 allows for fluid isolation and ventilation of the system with the result that the gauge may be removed or repaired without depressurising the system.

Figure 4:
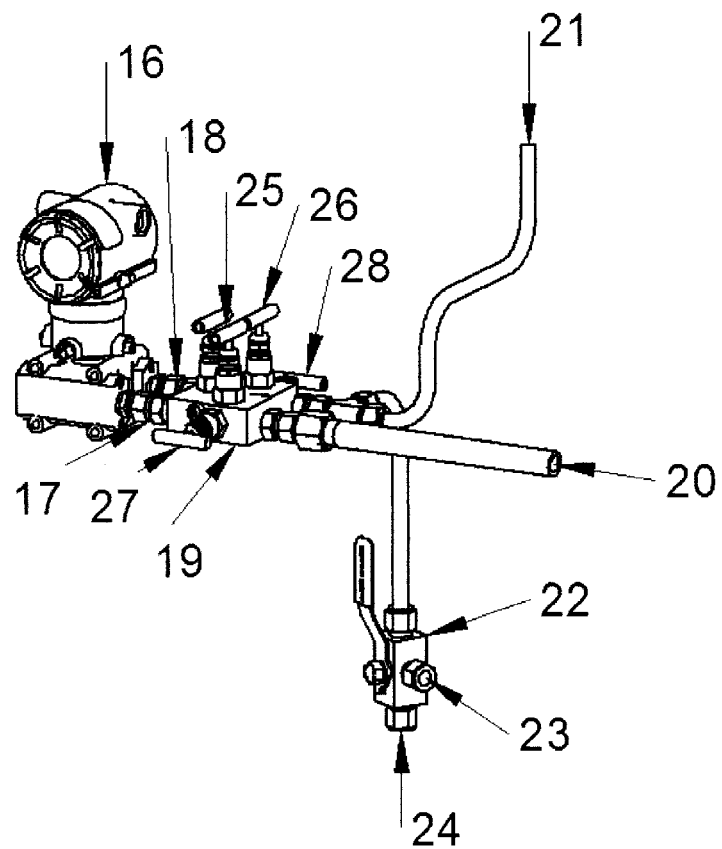

Referring to FIG. 4 of the accompanying drawings, a differential pressure transmitter 16 has high and low sides 17, 18 connected to a five valve manifold 19; the manifold 19 having connections such that oil pressure may be piped in through orifice 20 and gas pressure may be piped in through orifice 21. In addition to the five-valve manifold 19 is a three-way ball valve 22, which includes a port 23 through which gas may be used to pressurize the system and a drain point 24 where gas may be drained from the system. With reference to maintenance, there is provided in the five-valve manifold 19, valves 25, 26, which may be used to isolate the differential pressure transmitter 16 from the loop and further valves 27, 28, which may be used to drain off any excess gas or oil prior to the removal of the differential pressure transmitter 16.

While only several embodiments of the present invention have been shown and described, it will be obvious to those skilled in the art that many modifications may be made to the present invention without departing from the spirit and scope thereof.

What is claimed is:

1. A mechanical seal support system, comprising:
   a bladder accumulator with a first connection to a top portion of said bladder accumulator and a second connection to a bottom portion of said bladder accumulator;
   means responsive to a difference in pressures between said first connection and said second connection of said bladder accumulator and for providing an output determined by the difference between said pressures at each of said first connection and said second connection;
   means for determining a volume of fluid in said bladder accumulator based upon said output determined by the difference between said pressures at each of said first connection and said second connection; and,
   means for displaying said output indicative of the volume of fluid in said bladder accumulator relative to a predetermined volume of fluid.

2. The mechanical seal support system according to claim 1, wherein said means for displaying said output is disposed out of an internal volume of said bladder accumulator.

3. The mechanical seal support system according to claim 1, wherein said bladder connection includes a port and further comprising a manifold for connecting said port of said bladder accumulator to said means responsive to pressures for permitting interference with said means responsive to a difference in pressures without depressurizing said mechanical seal support system.

4. The mechanical seal support system according to claim 3, wherein said manifold is situated for allowing pre-charging of said bladder accumulator at a maximum reach of a person in the fifth percentile of human reach.

5. The mechanical seal support system according to claim 1, further comprising means for determining absolute pressure between said first connection and said second connection of said bladder accumulator.

6. The mechanical seal support system according to claim 1, wherein means for displaying said output includes means for displaying a comparative pressure reading and an absolute pressure reading.

7. The mechanical seal support system according to claim 1, further comprising means for transmitting said output to a receiver.

8. The mechanical seal support system according to claim 1, further comprising means for providing additional fluid to said bladder accumulator in response to said output.

9. A method for determining a volume of fluid in a bladder accumulator for a mechanical seal support system, comprising the steps of:
   determining an initial, or predetermined, volume of fluid in the bladder accumulator;
   providing the bladder accumulator with a first connection to a top portion of the bladder accumulator and a second connection to a bottom portion of said bladder accumulator;
   measuring pressure at the first connection of the bladder accumulator;
   measuring pressure at the second connection of the bladder accumulator;
   determining a difference between the pressure at the first connection of the bladder accumulator and the pressure at the second connection of the bladder accumulator;
   determining a volume of fluid in the bladder accumulator based upon the difference between the pressure at the first connection of the bladder accumulator and the pressure at the second connection of the bladder accumulator; and,
   displaying the volume of fluid in the bladder accumulator relative to the initial, or predetermined, volume of fluid.

10. The method for determining a volume of fluid in a bladder accumulator for a mechanical seal support system according to claim 9, further comprising the step of determining absolute pressure between the first connection and the second connection of the bladder accumulator.

11. The method for determining a volume of fluid in a bladder accumulator for a mechanical seal support system according to claim 9, wherein said step of displaying the volume of fluid in the bladder accumulator includes displaying a comparative pressure reading and an absolute pressure reading.

12. The method for determining a volume of fluid in a bladder accumulator for a mechanical seal support system according to claim 9, further comprising the step of providing additional fluid to the bladder accumulator in response to the volume of fluid in the bladder accumulator based upon the difference between the pressure at the first connection of the bladder accumulator and the pressure at the second connection of the bladder accumulator relative to the initial, or predetermined, volume of fluid.

* * * * *